(12) United States Patent
Byun et al.

(10) Patent No.: US 12,735,127 B2
(45) Date of Patent: Sep. 15, 2026

(54) WINDING UNIT AND VEHICLE AIR SKIRT APPARATUS COMPRISING THE SAME

(71) Applicant: HYUNDAI MOBIS CO., LTD., Seoul (KR)

(72) Inventors: Jae Sup Byun, Yongin-si (KR); Jang Ho Kim, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 320 days.

(21) Appl. No.: 18/423,753

(22) Filed: Jan. 26, 2024

(65) Prior Publication Data

US 2025/0065964 A1 Feb. 27, 2025

(30) Foreign Application Priority Data

Aug. 23, 2023 (KR) ........................ 10-2023-0110573

(51) Int. Cl.
*B62D 35/02* (2006.01)

(52) U.S. Cl.
CPC .................................... *B62D 35/02* (2013.01)

(58) Field of Classification Search
CPC ...... B62D 37/02; B62D 35/02; B62D 35/005; B60Y 2400/40
See application file for complete search history.

(56) References Cited

U.S. PATENT DOCUMENTS

| | | | | |
|---|---|---|---|---|
| 4,291,911 | A * | 9/1981 | Gallmeyer ........... | B62D 35/005 296/91 |
| 4,585,262 | A * | 4/1986 | Parks .................. | B62D 35/005 296/180.1 |
| 4,976,489 | A * | 12/1990 | Lovelace ............ | B62D 35/005 296/180.1 |
| 7,871,121 | B1 * | 1/2011 | Ragsdale ............ | B62D 35/001 296/180.1 |
| 2018/0265142 | A1 * | 9/2018 | Titus .................... | B62D 15/021 |
| 2022/0153356 | A1 | 5/2022 | Salter et al. | |
| 2022/0315135 | A1 | 10/2022 | Moradnia et al. | |

FOREIGN PATENT DOCUMENTS

DE 10 2018 209 474 A1 12/2019

OTHER PUBLICATIONS

Extended European Search Report dated Aug. 13, 2024, issued in corresponding European Patent Application No. 24155041.7.

* cited by examiner

*Primary Examiner* — Lori Lyjak
(74) *Attorney, Agent, or Firm* — MORGAN, LEWIS & BOCKIUS LLP

(57) ABSTRACT

A winding unit, which winds a skirt for blocking inflow of a headwind generated when a vehicle travels, includes an actuator which generates power, a roller which is coupled to the skirt and winds the skirt, a holder coupled to an end portion of the skirt, and a driving link which connects the holder and the actuator and moves the holder using the power generated by the actuator. The winding unit may be improved so that an air skirt apparatus does not require additional operation space in a width direction.

9 Claims, 12 Drawing Sheets

[FIG. 2]
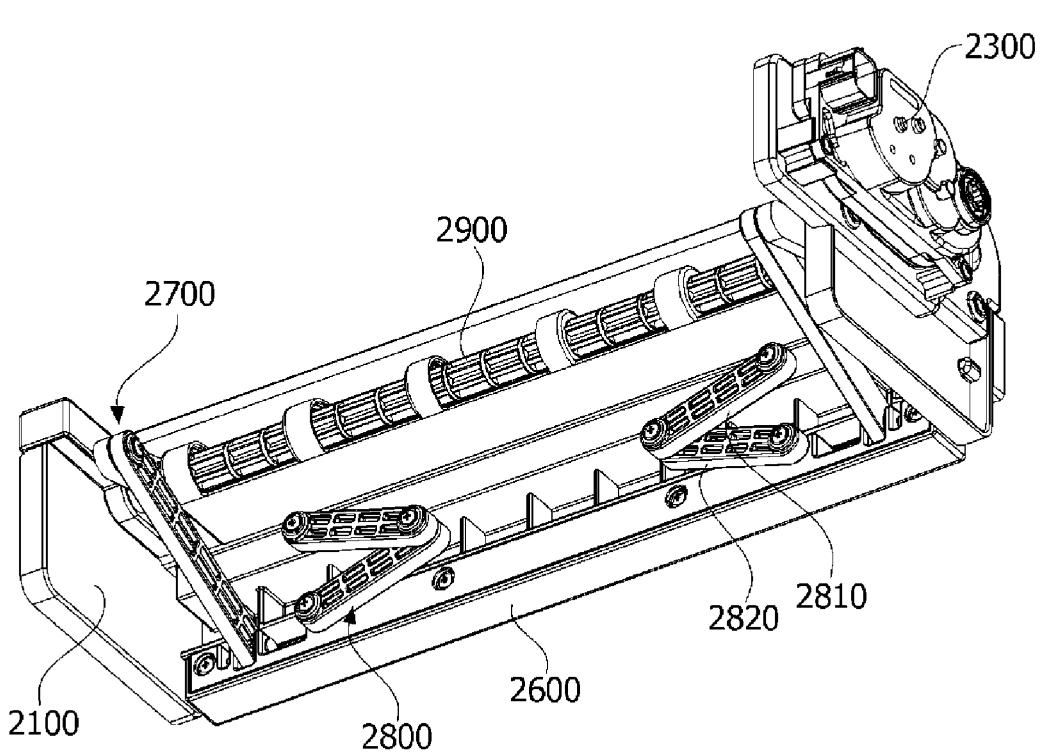

[FIG. 3]
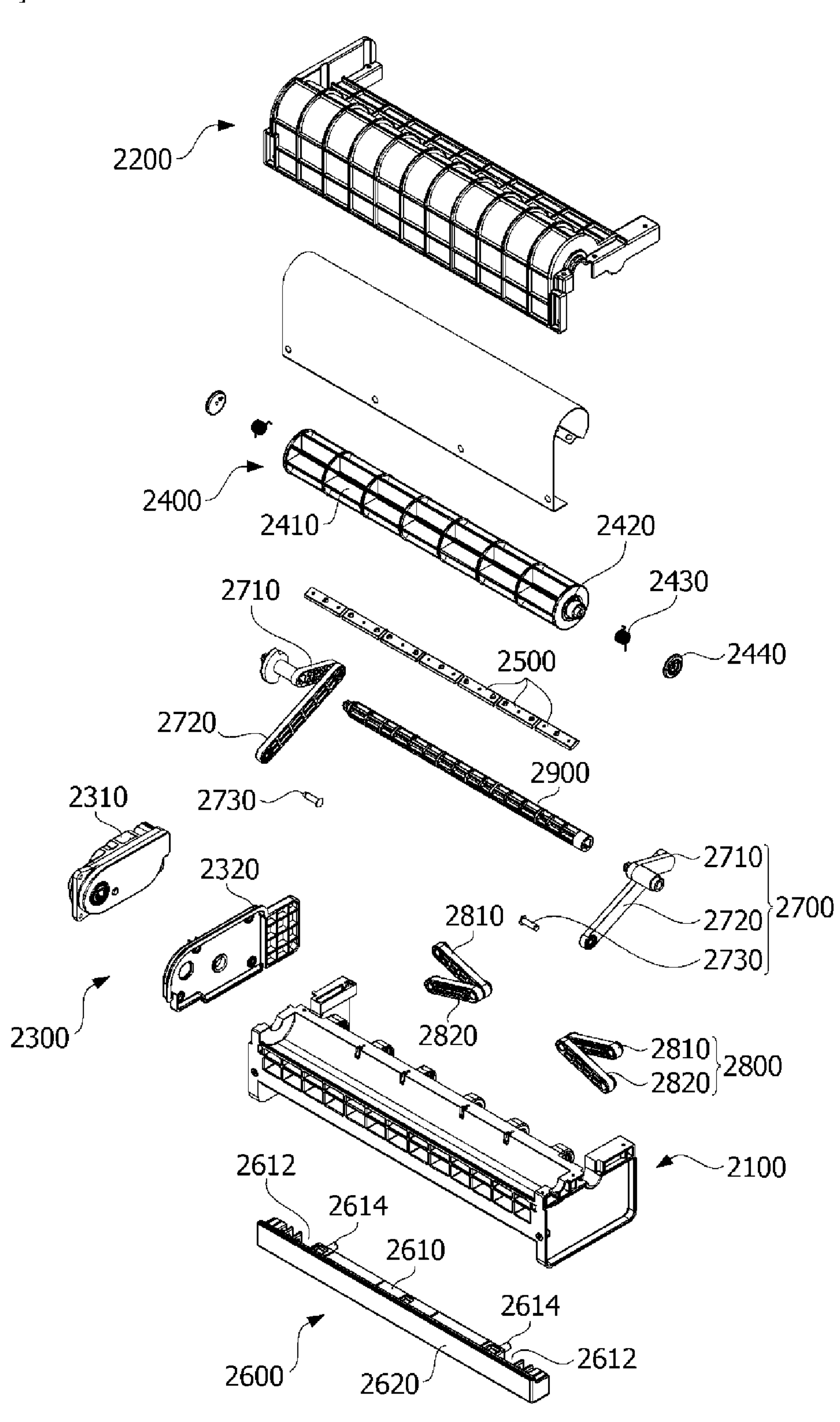

[FIG. 4]
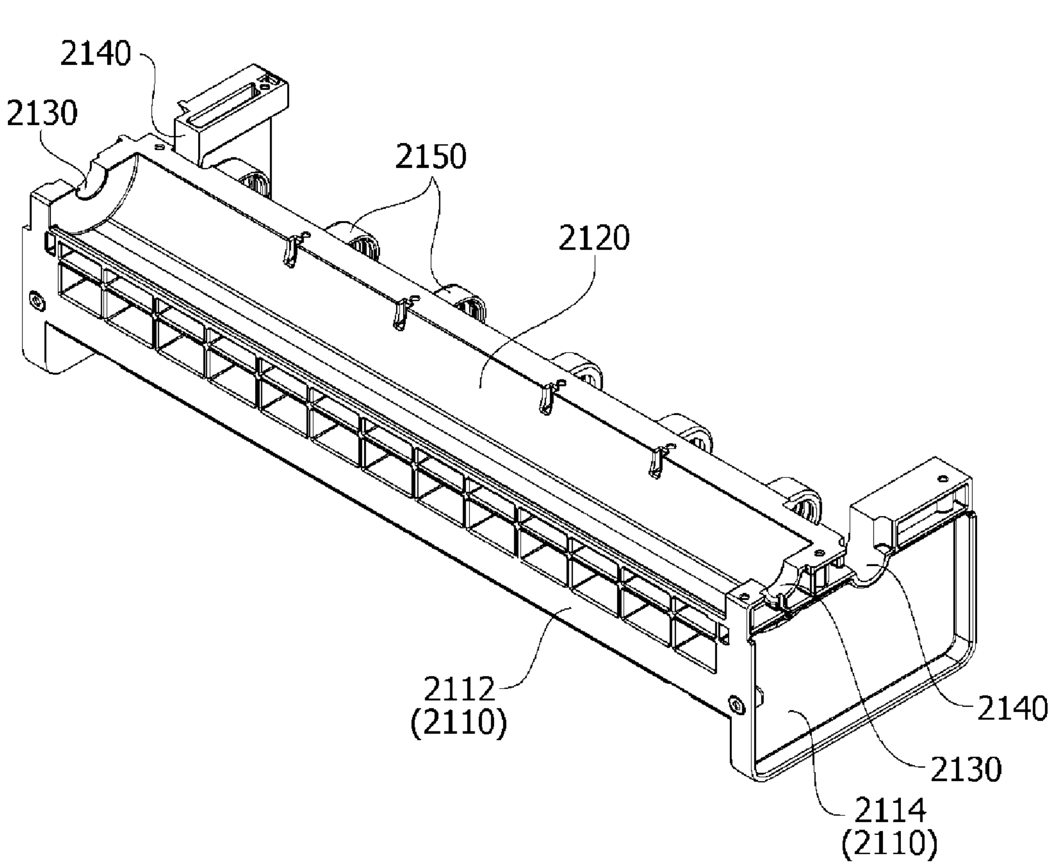

[FIG. 5]
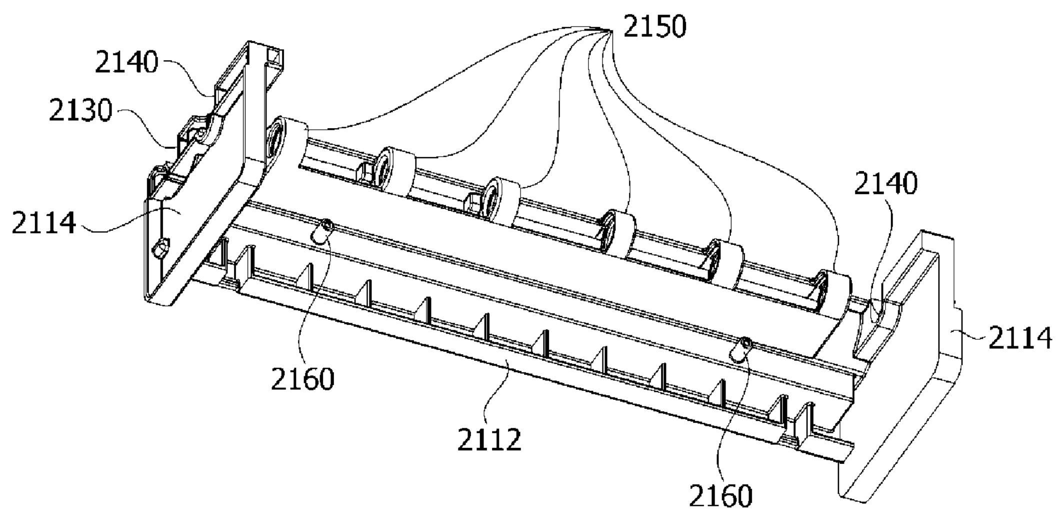

[FIG. 6]
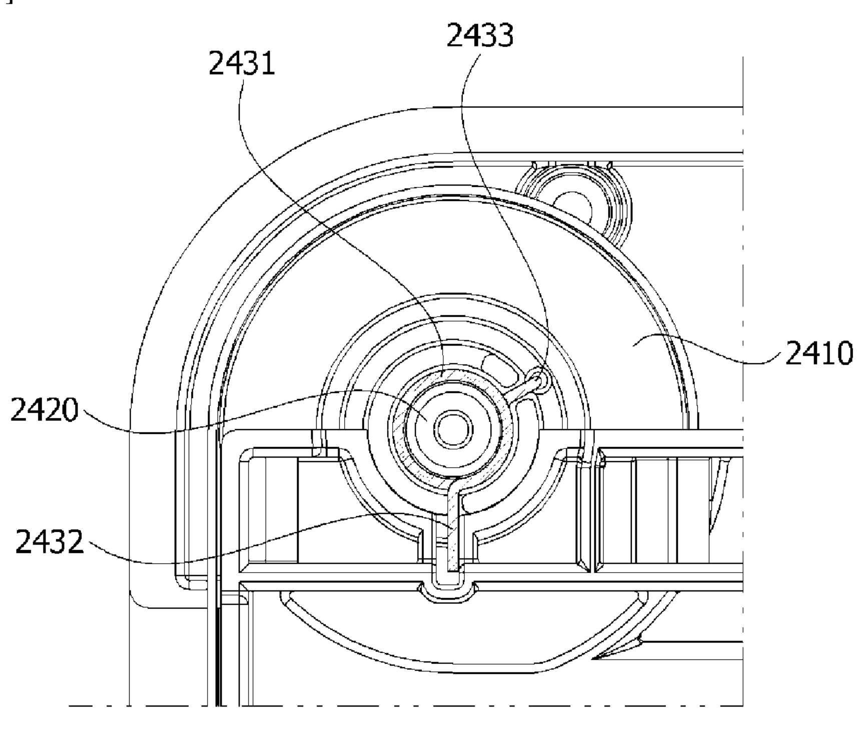
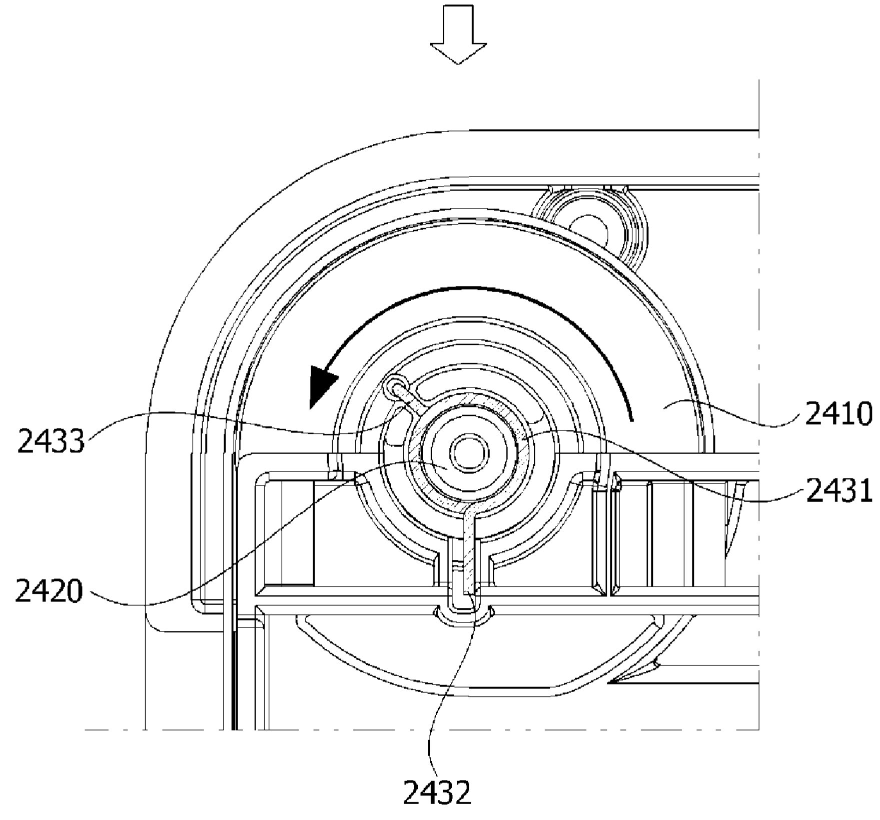

[FIG. 7]
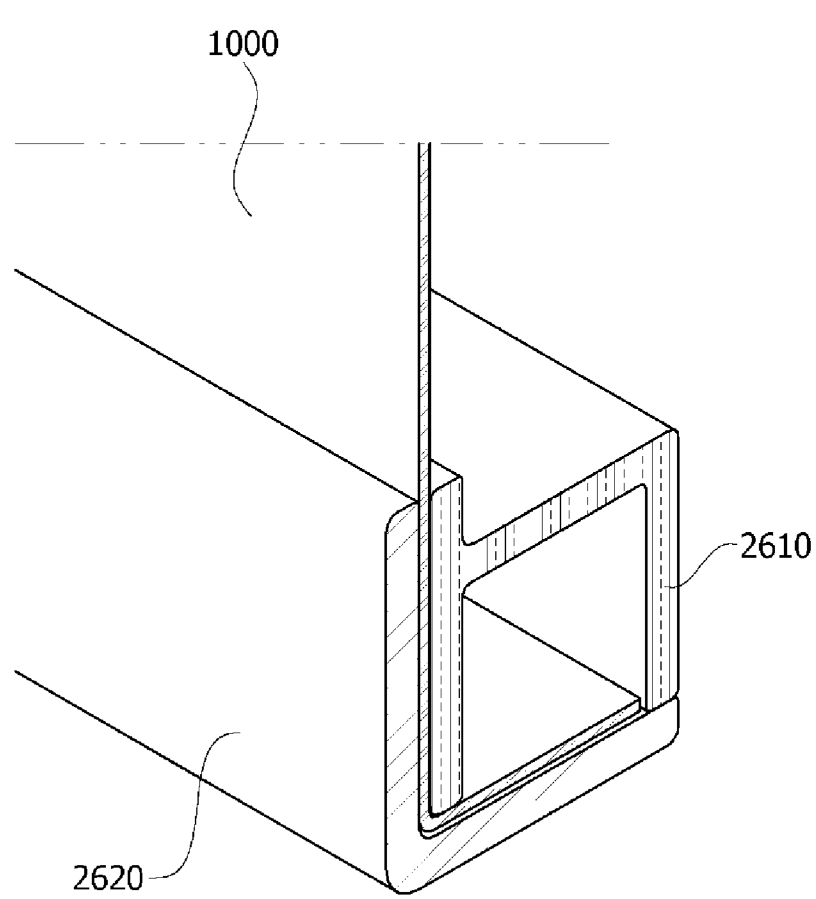

[FIG. 8]
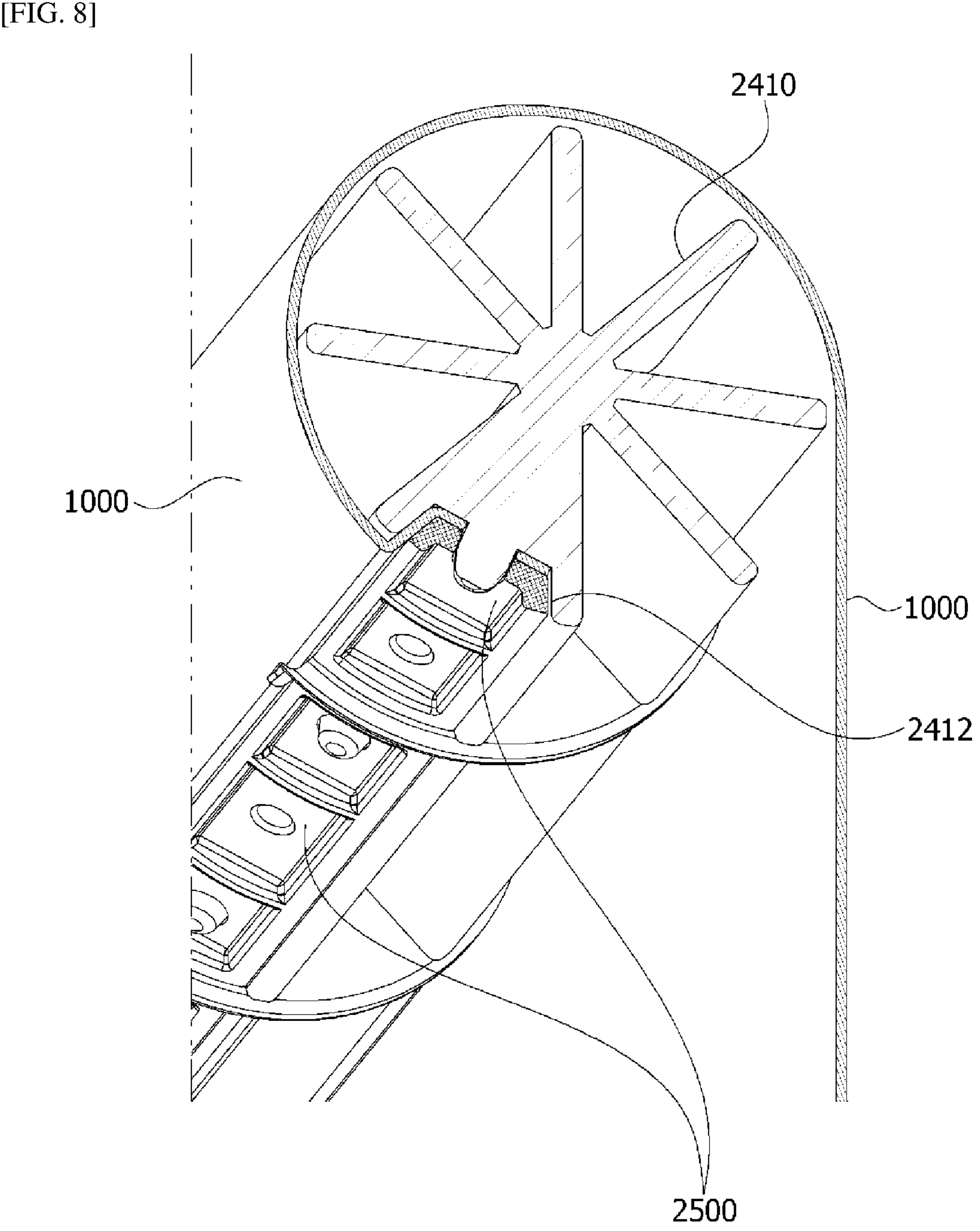

[FIG. 9]
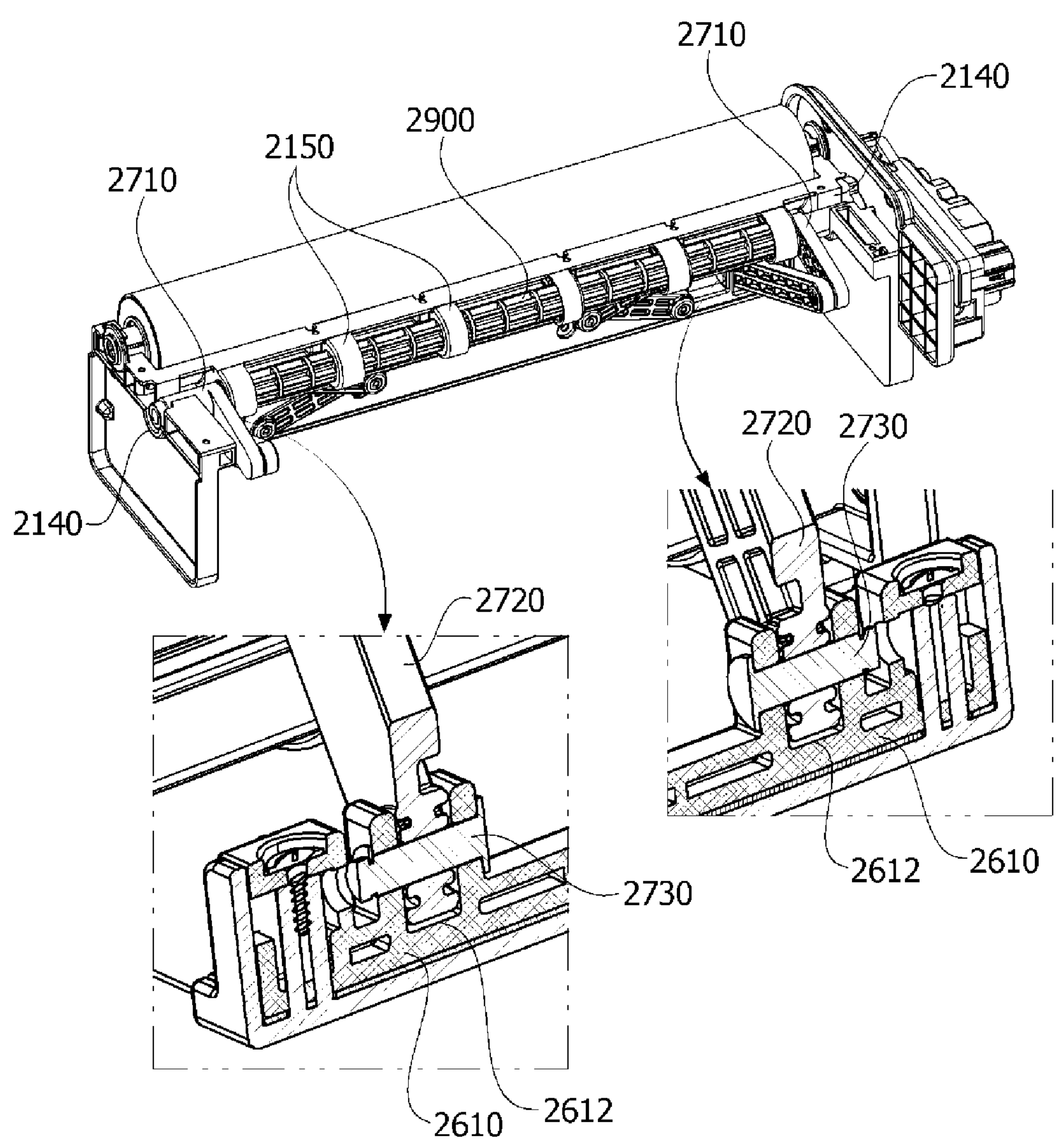

[FIG. 10]
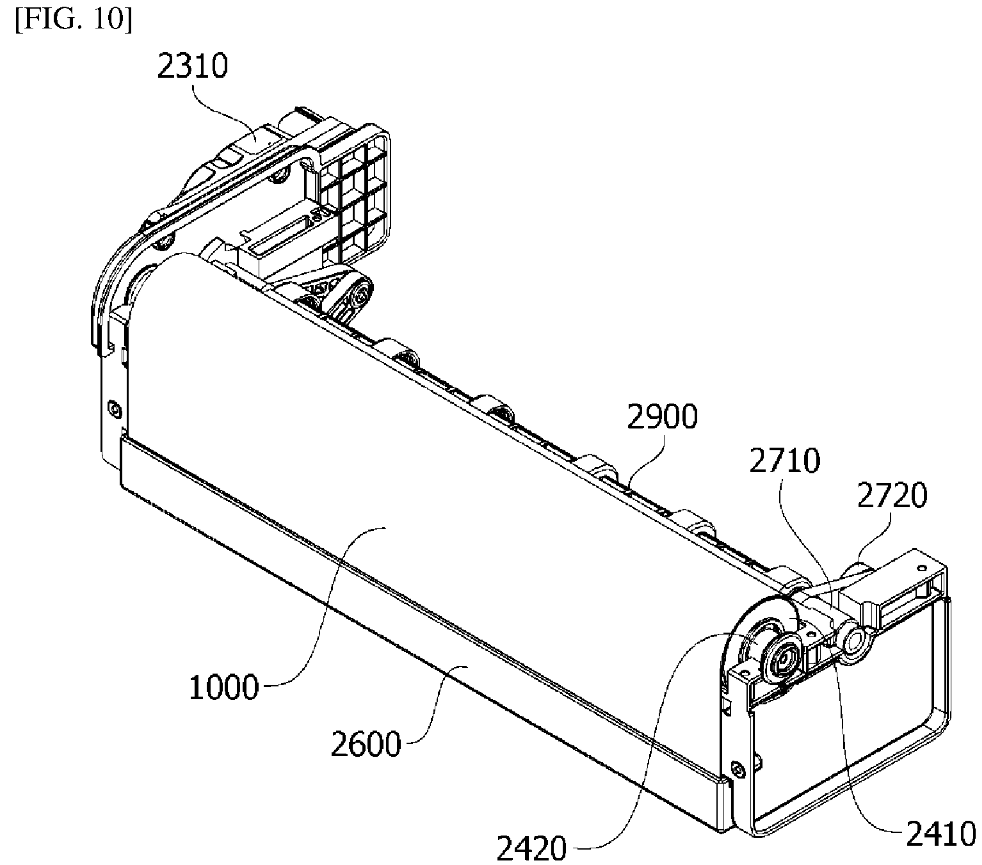

[FIG. 11A]
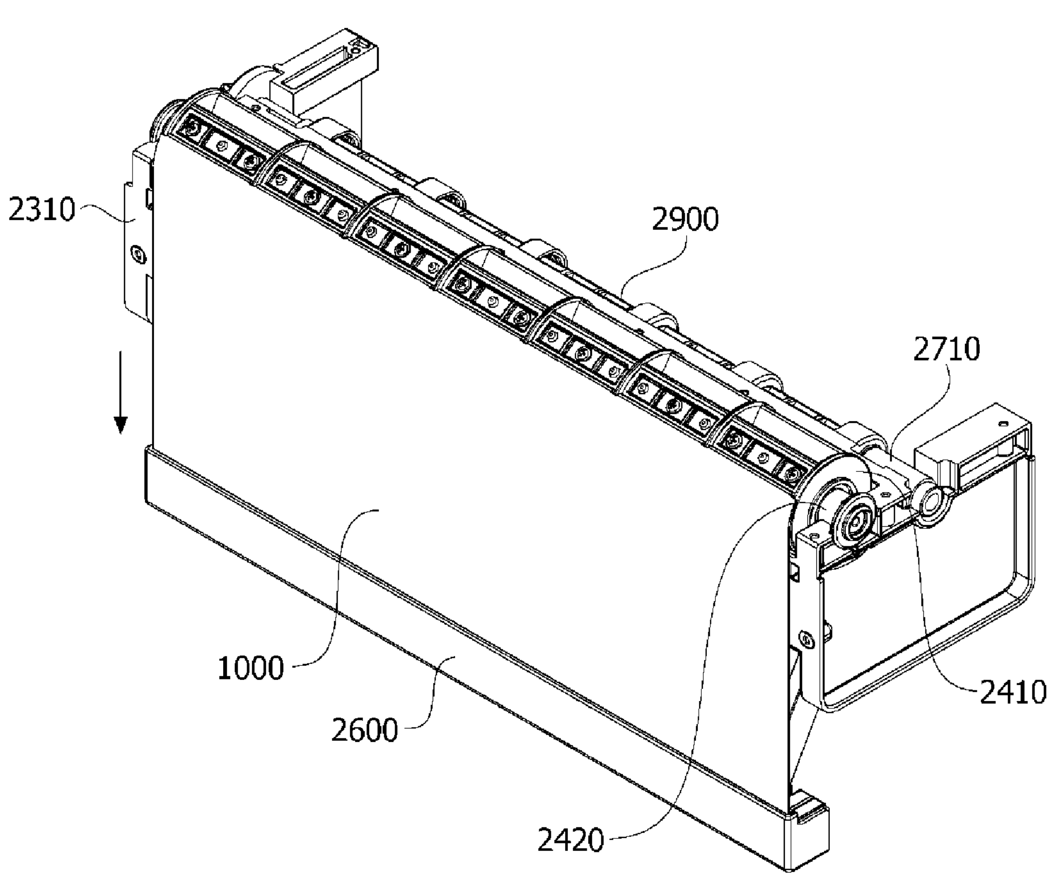

[FIG. 11B]
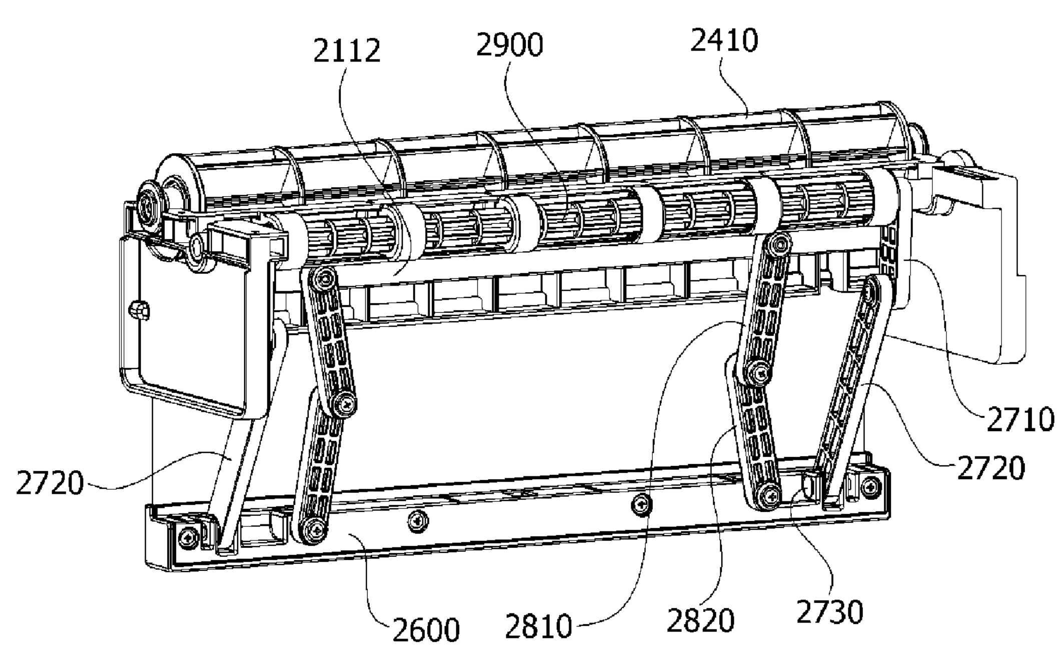

WINDING UNIT AND VEHICLE AIR SKIRT APPARATUS COMPRISING THE SAME

CROSS-REFERENCE TO RELATED APPLICATION

This application claims priority to and the benefit of Korean Patent Application No. 10-2023-0110573, filed on 23 Aug. 2023, the disclosure of which is incorporated herein by reference in its entirety.

BACKGROUND

1. Field of the Invention

The present invention relates to a winding unit and a vehicle air skirt apparatus including the same.

2. Discussion of Related Art

When a vehicle travels, a vehicle body collides with a headwind which is air in an atmosphere, and thus an air resistance force is applied to the vehicle, and in this case, the resistance force of the headwind causes a decrease in fuel efficiency.

Accordingly, a structure for improving aerodynamic performance and increasing the fuel efficiency by reducing the resistance force of the headwind is required in the vehicle.

One example of an apparatus for improving aerodynamic performance includes an active air skirt apparatus which actively operates in conjunction with a speed of the vehicle. In a state in which the active air skirt apparatus is mounted in a front bumper, when the vehicle travels at a high speed, the active air skirt apparatus reduces an amount of air being introduced to an under body through the front bumper to improve the aerodynamic performance. The active air skirt apparatus may include a skirt protruding outward from the vehicle and a link unit for rotating the skirt.

However, in the conventional active air skirt apparatus, a skirt is rotated in a width direction (a direction from a driver's seat toward a passenger seat or a direction opposite thereto) of a vehicle by a link unit, there is a problem that the active air skirt apparatus requires additional operation space in the width direction. Accordingly, when the skirt is rotated in the width direction, there is a problem that a collision with a bumper skin occurs, and a bumper and the skirt are damaged.

SUMMARY OF THE INVENTION

The present invention is directed to providing a winding unit improved so that an air skirt apparatus does not require additional operation space in a width direction and a vehicle air skirt apparatus including the same.

According to an aspect of the present invention, there is a winding unit configured to wind a skirt that blocks inflow of a headwind generated when a vehicle travels, the winding unit including an actuator which generates power, a roller configured to couple to the skirt and wind the skirt, a holder configured to couple to an end portion of the skirt, and a driving link which connects the holder and the actuator and moves the holder using the power generated by the actuator.

The holder may be configured to pull or push the skirt such that the skirt may be deployed or retracted in conjunction with movement of the holder in a direction intersecting a direction in which the roller is disposed.

The skirt may include a material having waterproofness and flexibility.

The driving link may include a first link coupled to the actuator, a second link which connects the first link and the holder and moves in conjunction with movement of the first link, and a pin which rotatably couples the second link to the holder and transfers a force generated by movement of the second link to the holder.

According to another aspect of the present invention, there is a vehicle air skirt apparatus including a skirt which blocks inflow of a headwind and a winding unit which winds the skirt, the winding unit including an actuator which generates power, a roller which is coupled to the skirt and winds the skirt, a holder coupled to an end portion of the skirt, and a driving link which connects the holder and the actuator and moves the holder using the power generated by the actuator.

The skirt may be deployed or retracted in conjunction with movement of the holder in a direction intersecting a direction in which the roller is disposed.

The skirt may include a material having waterproofness and flexibility.

The driving link may include a first link coupled to the actuator, a second link which connects the first link and the holder and moves in conjunction with movement of the first link, and a pin which couples the second link to the holder so that the second link is rotatable and transfers a force generated by movement of the second link to the holder.

The vehicle air skirt apparatus may include a housing which rotatably supports the roller and the first link.

The vehicle air skirt apparatus may include an anti-slip link which connects the housing and the holder and prevent the skirt and the holder from being pushed back.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which:

FIG. 1 is a front perspective view illustrating a vehicle air skirt apparatus according to one embodiment of the present invention;

FIG. 2 is a rear perspective view illustrating the vehicle air skirt apparatus according to one embodiment of the present invention;

FIG. 3 is an exploded perspective view illustrating the vehicle air skirt apparatus according to one embodiment of the present invention;

FIG. 4 is a front perspective view illustrating a housing;

FIG. 5 is a rear perspective view illustrating the housing;

FIG. 6 is a cross-sectional perspective view illustrating a skirt fixed to a holder;

FIG. 7 is a cross-sectional perspective view illustrating the skirt fixed to the holder using a second mounting plate;

FIG. 8 is a view illustrating a driving link coupled to the holder;

FIG. 9 is a view illustrating an elastic member rotated with a roller body;

FIG. 10 is a view illustrating a state in which the skirt is retracted on a roller; and FIGS. 11A and 11B are views illustrating a state in which the skirt is deployed.

DETAILED DESCRIPTION OF EXEMPLARY EMBODIMENTS

Since the present invention allows various changes and has many embodiments, specific embodiments will be illustrated in the accompanying drawings and described. However, this is not intended to limit the present invention to the specific embodiments, and it is to be appreciated that all changes, equivalents, and substitutes that fall within the spirit and technical scope of the present invention are encompassed in the present invention.

Although the terms "first," "second," and the like may be used herein to describe various elements, these elements should not be limited by these terms. These terms are only used to distinguish one element from another element. For example, a second element could be termed a first element, and a first element could similarly be termed a second element without departing from the scope of the present invention. The term "and/or" includes any one or any combination of a plurality of associated listed items.

When a first element is referred to as being "connected" or "coupled" to a second element, it should be understood that the first element may be directly connected or coupled to the second element, or a third element may be present therebetween. In contrast, when a first element is referred to as being "directly connected" or "directly coupled" to a second element, it will be understood that there are no intervening elements.

In a description of the embodiment, in a case in which any first element is described as being formed on or under a second element, such a description includes both a case in which the two elements are formed in direct contact with each other and a case in which the two elements are in indirect contact with each other with one or more third elements interposed between the two elements. In addition, when a first element is described as being formed on or under a second element, such a description may include a case in which the first element is formed at an upper side or a lower side with respect to the second element.

Terminology used herein is for the purpose of describing particular embodiments only and is not intended to limit the present invention. The singular forms are intended to include the plural forms, unless the context clearly indicates otherwise. In the present specification, it should be further understood that the terms "comprise," "comprising," "include," and/or "including," used herein specify the presence of stated features, numbers, steps, operations, elements, and/or components but do not preclude the presence or addition of one or more other features, numbers, steps, operations, elements, components, and/or groups thereof.

Unless otherwise defined, all terms including technical and scientific terms used herein have meanings which are the same as meanings generally understood by those skilled in the art. Terms, such as those defined in commonly used dictionaries, should be interpreted as having meanings that are consistent with their meanings in the context of the relevant art and will not be interpreted in an idealized or overly formal sense unless expressly so defined here.

Hereinafter, a winding unit and a vehicle air skirt apparatus including the same will be described in detail with reference to the accompanying drawings, and components that are the same or correspond to each other will be denoted by the same reference numerals, and redundant descriptions thereof will be omitted.

Figure 1:
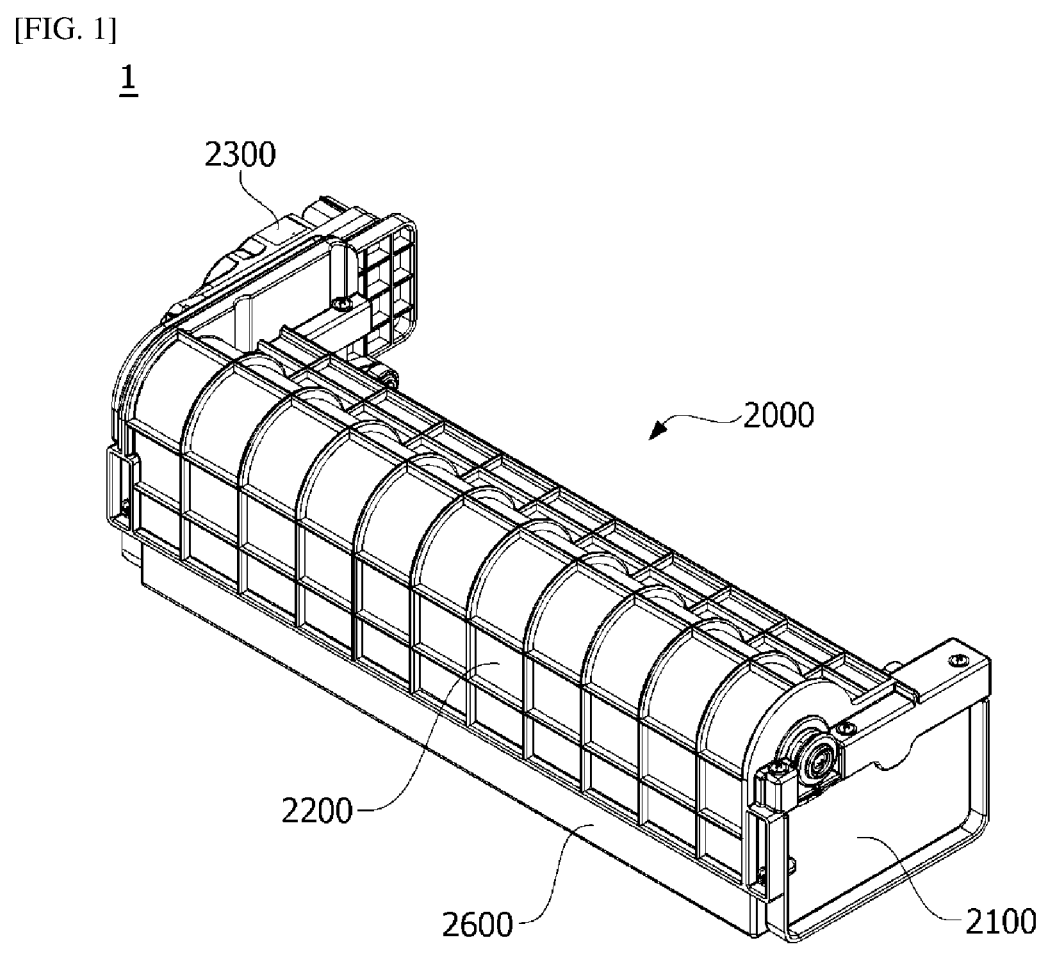

FIG. 1 is a front perspective view illustrating a vehicle air skirt apparatus according to one embodiment of the present invention, and FIG. 2 is a rear perspective view illustrating the vehicle air skirt apparatus according to one embodiment of the present invention.

Referring to FIGS. 1 and 2, a vehicle air skirt apparatus 1 according to one embodiment of the present invention may be disposed in a bumper of a vehicle. The vehicle air skirt apparatus 1 may block a headwind from passing under the bumper of the vehicle bumper in a longitudinal direction of the vehicle. In this case, the longitudinal direction may be a direction from a passenger room (not shown) toward an engine room (not shown) of the vehicle or a direction opposite thereto. The vehicle air skirt apparatus 1 includes a skirt 1000 for blocking inflow of a headwind and a winding unit 2000 for winding the skirt 1000.

The skirt 1000 may have a rectangular shape. The skirt 1000 may be formed of a material having waterproofness and flexibility. The flexible skirt 1000 may be wound around a roller 2400 which will be described below. When the skirt 1000 is deployed by the roller 2400, the skirt 1000 may protrude to the outside of the bumper of the vehicle. More specifically, the skirt 1000 may protrude downward from the bumper and may be exposed to the outside of the vehicle.

The skirt 1000 may block a headwind from being introduced into the vehicle. More specifically, the skirt 1000 may block foreign matter such as sand and a stone present on a road surface from coming into contact with a component disposed on a lower portion of the vehicle. In addition, the waterproof skirt 1000 may block water from being introduced into the vehicle when the vehicle passes over a waterhole.

FIG. 3 is an exploded perspective view illustrating the vehicle air skirt apparatus according to one embodiment of the present invention, and FIG. 4 is a front perspective view illustrating a housing. FIG. 5 is a rear perspective view illustrating the housing, and FIG. 6 is a cross-sectional perspective view illustrating a skirt fixed to a holder. FIG. 7 is a cross-sectional perspective view illustrating the skirt fixed to the holder using a second mounting plate, and FIG. 8 is a view illustrating a driving link coupled to the holder. FIG. 9 is a view illustrating an elastic member rotated with a roller body.

The winding unit 2000 may wind the skirt 1000 for blocking inflow of a headwind generated when the vehicle travels. The winding unit 2000 may include a housing 2100, a cover 2200, an actuator 2300, a roller 2400, a second mounting plate 2500, a holder 2600, a driving link 2700, an anti-slip link 2800, and a connecting shaft 2900.

Referring to FIGS. 2 to 5, the housing 2100 may rotatably support the roller 2400 and a first link 2710, which will be described below. The housing 2100 may include a housing body 2110, a first accommodation groove 2120, a first support groove 2130, a second support groove 2140, a first support protrusion 2150, and a second support protrusion 2160.

The housing body 2110 may form an exterior of the housing 2100. The housing body 2110 may include a main portion 2112 and side portions 2114. A length of the main portion 2112 may be greater than a length of the roller 2400 in a longitudinal direction. The main portion 2112 may have a thickness sufficient for forming the first accommodation groove 2120. In addition, the main portion 2112 may support the first support protrusion 2150 and the second support protrusion 2160. The side portions 2114 may be disposed on both side portions of the main portion 2112. The side portions 2114 may support the main portion 2112. The side portions 2114 and the main portion 2112 may form a space in which the holder 2600 is disposed. This may be structured to reduce a total height of the vehicle air skirt apparatus 1 in a height direction. In this case, the height direction may be a direction perpendicularly intersecting the longitudinal direction.

The first accommodation groove 2120 may be formed in the main portion 2112 of the housing body 2110. The first accommodation groove 2120 may have a semicircular shape. The first accommodation groove 2120 may rotatably accommodate a roller body 2410 of the roller 2400, which will be described below.

The first support groove 2130 may be formed in the side portion 2114 of the housing body 2110. The first support groove 2130 may be connected to the first accommodation groove 2120. The first support groove 2130 may have a semicircular shape. The first support groove 2130 may rotatably support a rolling shaft part 2420 of the roller 2400, which will be described below.

The second support groove 2140 may be formed in the side portion 2114 of the housing body 2110. The second support groove 2140 may be formed in a portion, which is not coupled to the main portion 2112, of the side portion 2114. The second support groove 2140 may have a semicircular shape. In the longitudinal direction, the second support groove 2140 may be disposed at a position overlapping a hole formed in the first support protrusion 2150. Accordingly, the second support groove 2140 may be concentric with the hole formed in the first support protrusion 2150. As illustrated in FIG. 9, the second support groove 2140 may rotatably support the first link 2710 of the driving link 2700, which will be described below.

The first support protrusion 2150 may be disposed on the main portion 2112. More specifically, the first support protrusion 2150 may be disposed on an outer surface of the main portion 2112. The first support protrusion 2150 may be disposed between two side portions 2114. The first support protrusion 2150 may be provided as a plurality of first support protrusions 2150 disposed on the outer surface of the main portion 2112 in the longitudinal direction. The first support protrusion 2150 may have a hollow shape. Accordingly, the first support protrusion 2150 may rotatably support the connecting shaft 2900.

The second support protrusion 2160 may be disposed on the outer surface of the main portion 2112. The second support protrusion 2160 may be disposed below the first support protrusion 2150 in the height direction. The second support protrusion 2160 may be provided as a plurality of second support protrusions 2160 disposed on the outer surface of the main portion 2112 in the longitudinal direction. The second support protrusion 2160 may protrude in a width direction. In this case, the width direction may be a direction intersecting the longitudinal direction. The second support protrusion 2160 may rotatably support a third link 2810 of the anti-slip link 2800, which will be described below.

Referring to FIGS. 1 to 3, the cover 2200 may cover parts of the skirt 1000, the roller 2400, and the housing 2100. The cover 2200 may be formed by coupling a curved portion and a linear portion. The cover 2200 may have a hollow shape. The cover 2200 may prevent foreign matter from coming into contact with each component of the skirt 1000 and the winding unit 2000. A plurality of ribs for reinforcing rigidity may be disposed on an outer surface of the cover 2200.

Referring to FIGS. 1 to 3, the actuator 2300 may be disposed on any one of two side portions 2114 of the housing 2100. The actuator 2300 may include an actuator body 2310 and a first mounting plate 2320. The actuator body 2310 may be connected to a power supply apparatus for supplying external power. The actuator body 2310 may generate power when receiving a signal from the power supply apparatus. The actuator body 2310 may be coupled to the first link 2710 of the driving link 2700, which will be described below.

The first mounting plate 2320 may be disposed between the side portion 2114 of the housing 2100 and the actuator body 2310. The first mounting plate 2320 may be fixed to the side portion 2114 of the housing 2100 using a coupling member such as a bolt. The first mounting plate 2320 may absorb vibrations generated by the actuator body 2310 and absorb vibrations generated by the housing 2100. Accordingly, the first mounting plate 2320 may improve the stability of the vehicle air skirt apparatus 1 by absorbing vibrations of the vehicle air skirt apparatus 1.

Referring to FIGS. 3, 6, 8, and 9, the roller 2400 may be coupled to the skirt 1000 and wind the skirt 1000. The roller 2400 may include the roller body 2410, the rolling shaft part 2420, an elastic member 2430, and a cap 2440.

The roller body 2410 may have a cylindrical shape. In addition, a plurality of ribs for reinforcing rigidity may be disposed on an outer surface of the roller body 2410 to prevent a phenomenon such as distortion when the roller body 2410 rotates. The roller body 2410 may be rotatably disposed in the first accommodation groove 2120 of the housing 2100.

The roller body 2410 may include a second accommodation groove 2412. As illustrated in FIG. 8, the second accommodation groove 2412 may have a concave shape from the outer surface of the roller body 2410 toward a center of the roller body 2410. The second accommodation groove 2412 may accommodate one end portion of the skirt 1000 and the second mounting plate 2500. In addition, the roller body 2410 may further include a protrusion coupled to the skirt 1000 and the second mounting plate 2500. Accordingly, the number of coupling members is decreased by the roller body 2410, and thus an effect of reducing manufacturing costs can be obtained.

The rolling shaft part 2420 may be disposed on both end portions of the roller body 2410 in the longitudinal direction. The rolling shaft part may be rotatably disposed in the first support groove 2130 formed in the side portions 2114 of the housing 2100 illustrated in FIG. 4. The rolling shaft part 2420 may have a hollow shape. When the roller body 2410 coupled to the skirt 1000 rotates, the rolling shaft part 2420 may be guided by the first support groove 2130 of the housing 2100 to rotate along the roller body 2410.

The elastic member 2430 may be disposed in the rolling shaft part 2420. As illustrated in FIG. 6, the elastic member 2430 may include a winding part 2431, a first end portion 2432, and a second end portion 2433. The elastic member 2430 including the winding part 2431, the first end portion 2432, and the second end portion 2433 may be a torsion spring.

The winding part 2431 may be wound around the rolling shaft part 2420 and maintained in a wound state. The winding part 2431 may support the first end portion 2432 and the second end portion 2433. The winding part 2431 may rotate with the rolling shaft part 2420.

The first end portion 2432 may be disposed on one end portion of the winding part 2431. The first end portion 2432 may be supported by an additional groove connected to the first accommodation groove 2120 of the housing 2100. As illustrated in FIG. 6, a length of the additional groove connected to the first accommodation groove 2120 of the housing 2100 is greater than a length of the first end portion 2432, and a width of the additional groove is smaller than the length of the first end portion 2432. Accordingly, a state in which the first end portion 2432 is fixed in the additional groove connected to the first accommodation groove 2120 of the housing 2100 may be maintained.

The second end portion 2433 may be disposed on the other end portion of the winding part 2431. The second end portion 2433 may protrude to the outside of the rolling shaft part 2420 through a hole formed in the rolling shaft part 2420, and a part of the second end portion 2433 protruding to the outside of the rolling shaft part 2420 may be fixed to the roller body 2410. Accordingly, when the roller body 2410 and the rolling shaft part 2420 rotate, the second end portion 2433 may rotate with the roller body 2410.

As illustrated in FIG. 6, when the roller body 2410 rotates to deploy the skirt 1000 in the height direction, the second end portion 2433 of the elastic member 2430 rotates with the roller body 2410. In this case, since the first end portion 2432 does not rotate, when the skirt 1000 is wound to be retracted, the second end portion 2433 may rotate the roller body 2410 in a direction opposite to a direction in which the skirt 1000 rotates to be deployed by a force for restoring the second end portion 2433 to a state before the second end portion 2433 is rotated. As described above, the elastic member 2430 may help restoring rotation of the roller 2400.

The cap 2440 may be coupled to the rolling shaft part 2420. The cap 2440 may prevent the elastic member 2430 disposed in the rolling shaft part 2420 from escaping outward from the rolling shaft part 2420.

Referring to FIGS. 3 and 8, the second mounting plate 2500 may be provided as a plurality of second mounting plates 2500. As illustrated in FIG. 8, the second mounting plate 2500 may be coupled to one end portion of the skirt 1000. In addition, the second mounting plate 2500 may be disposed in the second accommodation groove 2412 of the roller body 2410. The second mounting plate 2500 may be coupled to a protrusion formed on the roller 2400 and fixed to the roller 2400 and may be fixed to the roller body 2410 using a coupling member such as a bolt. In this case, the other end portion of the skirt 1000 may be fixed to the roller 2400 using a coupling member coupled to the second mounting plate 2500.

Referring to FIGS. 3, 7, and 9, the holder 2600 may be coupled to an end portion of the skirt 1000. The holder 2600 may be coupled to the end portion of the skirt 1000 and moved by the driving link 2700 to pull or push the skirt 1000. The holder 2600 may be disposed on a lower portion of the housing 2100 in the height direction. More specifically, the holder 2600 may be disposed in a space formed by the main portion 2112 and the side portions 2114 of the housing 2100. The holder 2600 may include a holding block 2610 and a case 2620.

The holding block 2610 may form an exterior of the holder 2600. The holding block 2610 may have a shape having a length in the longitudinal direction. The holding block 2610 may be in contact with one surface of one end portion of the skirt 1000, and the holding block 2610 and the case 2620 may be coupled to one end portion of the skirt 1000. The holding block 2610 may include a third accommodation groove 2612 and a third support protrusion 2614.

The third accommodation groove 2612 may have a concave shape from an outer surface of the holding block 2610 toward the inside of the holding block 2610. The third accommodation groove 2612 may be provided as a plurality of third accommodation grooves 2612 disposed in the holding block 2610 to be spaced apart from each other in the longitudinal direction. The third accommodation groove 2612 may accommodate an end portion of a second link 2720 of the driving link 2700, which will be described below. In addition, the third accommodation groove 2612 may include a pin 2730 of the driving link 2700, which will be described below.

The third support protrusion 2614 may be disposed between the plurality of third accommodation grooves 2612 in the longitudinal direction. The third support protrusion 2614 may protrude from the outer surface of the holding block 2610 in the width direction. The third support protrusion 2614 may be formed in a cylindrical shape. The third support protrusion 2614 may rotatably support a fourth link 2820 of the anti-slip link 2800, which will be described below.

As illustrated in FIG. 7, the case 2620 may be coupled to a part of the outer surface of the holding block 2610. The case 2620 and the holding block 2610 may be coupled to one end portion of the skirt 1000. Accordingly, the case 2620 and the holding block 2610 may fix one end portion of the skirt 1000.

Referring to FIGS. 2, 3, and 9, the driving link 2700 may connect the holder 2600 and the actuator 2300 and move the holder 2600 using power generated by the actuator 2300. The driving link 2700 may be provided as a plurality of driving links 2700 disposed inside the side portions 2114 of the housing 2100 to be spaced apart from each other in the longitudinal direction. The driving link 2700 may include the first link 2710, the second link 2720, and the pin 2730.

As illustrated in FIGS. 2 and 9, the first link 2710 may be coupled to the actuator body 2310 of the actuator 2300. The first link 2710 may be coupled to the connecting shaft 2900. In addition, the first link 2710 may be rotatably supported by the first support groove 2130 formed in the side portion 2114 of the housing 2100. Accordingly, when power is generated by the actuator 2300, the first link 2710 connected to the actuator body 2310 may rotate the connecting shaft 2900. When the connecting shaft 2900 rotates, the other first link 2710 which is not connected to the actuator body 2310 may rotate.

One end portion of the second link 2720 may be coupled to the first link 2710, and the other end portion thereof may be disposed in the third accommodation groove 2612 formed in the holding block 2610 of the holder 2600. The second link 2720 may be rotatably coupled to the first link 2710 using a coupling member such as a bolt. Accordingly, the second link 2720 may connect the first link 2710 and the holder 2600 and move in conjunction with movement of the first link 2710.

The pin 2730 may be provided as a combination of a disc-shaped head and a cylindrical body. The pin 2730 may pass through the holding block 2610 forming the third accommodation groove 2612 of the holder 2600. Accordingly, the pin 2730 may rotatably couple the second link 2720 to the holder 2600.

The pin 2730 may transfer a force generated by movement of the second link 2720 to the holder 2600. More specifically, when the second link 2720 may move in conjunction with the movement of the first link 2710 to press the pin 2730, the pin 2730 may press the holding block 2610 using a force of the second link 2720 pressing the pin 2730. Accordingly, the holding block 2610 may move in a direction in which the skirt 1000 is deployed or retracted in the height direction. That is, the pin 2730 may be a medium for transferring a force. Accordingly, the pin 2730 may preferably be formed of a rigid material.

Referring to FIGS. 2 and 3, the anti-slip link 2800 may connect the housing 2100 and the holder 2600 and prevent the skirt 1000 and the holder 2600 from being pushed back. The anti-slip link 2800 may include the third link 2810 and the fourth link 2820.

The third link 2810 may be rotatably coupled to the second support protrusion 2160 of the housing 2100. One end portion of the fourth link 2820 may be rotatably coupled to the third link 2810 using a coupling member such as a bolt, and the other end portion thereof may be rotatably coupled to the third support protrusion 2614 formed on the holding block 2610 of the holder 2600.

The anti-slip link 2800 having such a structure may have a rotation center disposed in a direction different from the driving link 2700. Accordingly, the anti-slip link 2800 may rotate in a direction different from the driving link 2700, more specifically, in a direction intersecting a rotation direction of the driving link 2700.

As illustrated in FIG. 11B which will be described below, when the holding block 2610 moves downward from the housing 2100 in the height direction, the third link 2810 and the fourth link 2820 of the anti-slip link 2800 may be disposed to be substantially parallel to each other to block movement of the holding block 2610 in the width direction. Accordingly, movement of the skirt 1000 coupled to the holder 2600 in the width direction may be blocked so that an effect of preventing the skirt 1000 from being pushed back in the width direction by a headwind can be obtained.

Referring to FIGS. 3, 5, and 9, the connecting shaft 2900 may have a cylindrical shape. A plurality of ribs for preventing damage when the connecting shaft 2900 rotates may be formed on an outer surface of the connecting shaft 2900. The connecting shaft 2900 may be rotatably disposed in the first support protrusion 2150 of the housing 2100. The connecting shaft 2900 may be coupled to a plurality of first links 2710 of the driving link 2700. Accordingly, when the first links 2710 are rotated by power generated by the actuator 2300, the connecting shaft 2900 may rotate the other first links 2710.

Hereinafter, an operation process of the vehicle air skirt apparatus 1 will be described.

FIG. 10 is a view illustrating a state in which the skirt is retracted on a roller, and FIGS. 11A and 11B are views illustrating a state in which the skirt is deployed. Referring to FIGS. 1 to 11B, more specifically, in FIGS. 10 to 11B, in a state in which the skirt 1000 is not deployed in the height direction, the skirt 1000 is rolled around the roller body 2410 of the roller 2400 and retracted, and the holder 2600 is disposed in the space formed by the main portion 2112 and the side portions 2114 of the housing 2100.

In this state, when power is supplied from an external power supply apparatus, the actuator body 2310 generates power. When the power is generated by the actuator body 2310, the first link 2710 of the driving link 2700 connected to the actuator body 2310 rotates. When the first link 2710 rotates, the connecting shaft 2900 connected to the first link 2710 rotates, and the other first link 2710 connected to the connecting shaft 2900 also rotates with the connecting shaft 2900.

As described above, when the plurality of first links 2710 rotate, the second link 2720 connected to the first link 2710 rotates in conjunction with the movement of the first link 2710. The second link 2720 rotated by the first link 2710 presses the pin 2730, and the pin 2730 transfers a pressing force transferred from the second link 2720 to the holding block 2610 of the holder 2600. The holding block 2610 which receives the pressing force from the pin 2730 starts to move to a lower side of the housing 2100 in the height direction. When the holding block 2610 moves, the case 2620 of the holder 2600 and one end portion of the skirt 1000 fixed to the holder 2600 move to the lower side of the housing 2100.

When one end portion of the skirt 1000 starts to move to the lower side of the housing 2100, the roller 2400 which fixes the other end portion of the skirt 1000 receives a force pulling the skirt 1000 to start to rotate about an axial center of the rolling shaft part 2420. Accordingly, as illustrated in FIG. 11A, the skirt 1000 may move to be exposed to the outside of the vehicle to block a headwind.

When the holding block 2610 moves to the lower side of the housing 2100 in the height direction by the second link 2720 and the pin 2730, the third link 2810 and the fourth link 2820 of the anti-slip link 2800 rotate simultaneously. More specifically, the fourth link 2820 which rotates in conjunction with the third link 2810 is rotatably supported by the holding block 2610. Accordingly, the third link 2810 and the fourth link 2820, which are in deployed states, absorb a force generated by the holding block 2610 being pushed in the width direction to prevent the holding block 2610 from being pushed back in the width direction. Accordingly, vibrations of the holder 2600 and the skirt 1000 are reduced.

As described above, the skirt 1000 of the vehicle air skirt apparatus 1 according to one embodiment of the present invention may be deployed or retracted in a direction intersecting a direction in which the roller 2400 is disposed in conjunction with movement of the holder 2600. Accordingly, since the vehicle air skirt apparatus 1 according to one embodiment of the present invention does not require an operation space disposed outward in the longitudinal direction of the housing 2100 when compared to the conventional air skirt apparatus which rotates in the width direction to cover the lower end portion of the vehicle, collision with the bumper can be prevented. Accordingly, a repairing cost and time due to damage to the bumper and damage to the vehicle air skirt apparatus 1 can be reduced.

In addition, since the vehicle air skirt apparatus 1 according to one embodiment of the present invention moves the skirt 1000 linearly in the height direction when compared to the conventional air skirt apparatus which rotates in the width direction to cover the lower end portion of the vehicle, a deployment time of the skirt 1000 can be shortened. Accordingly, the vehicle air skirt apparatus 1 according to one embodiment of the present invention may have an effect of blocking a headwind more quickly than the conventional air skirt apparatus.

According to one embodiment of the present invention, since an air skirt apparatus does not require additional operation space is in a width direction, damage to a bumper and a skirt due to collision with a bumper skin is prevented, and thus a repair cost and time can be reduced.

In addition, according to one embodiment of the present invention, since an air skirt apparatus does not require additional operation space in a width direction, a space in which additional components are arranged to improve driving performance of a vehicle is secured, and thus the driving performance of the vehicle can be improved.

While the present invention has been described above with reference to exemplary embodiments, it may be understood by those skilled in the art that various modifications and changes of the present invention may be made within a range not departing from the spirit and scope of the present invention defined by the appended claims. In addition, it should be interpreted that differences related to the modifications and changes fall within the scope of the present invention defined by the appended claims.

What is claimed is:

1. A winding unit configured to wind a skirt that blocks inflow of a headwind generated when a vehicle travels, the winding unit comprising:

an actuator which generates power;

a roller configured to couple to the skirt and wind the skirt;

a holder configured to couple to an end portion of the skirt;

a driving link which connects the holder and the actuator and moves the holder using the power generated by the actuator; and a housing including an accommodation groove, wherein the roller is rotatably disposed in the accommodation groove.

2. The winding unit of claim 1, wherein the holder is configured to pull or push the skirt such that the skirt is deployed or retracted in conjunction with movement of the holder in a direction intersecting a direction in which the roller is disposed.

3. The winding unit of claim 1, wherein the driving link includes:

a first link coupled to the actuator;

a second link which connects the first link and the holder and moves in conjunction with movement of the first link; and a pin which rotatably couples the second link to the holder and transfers a force generated by movement of the second link to the holder.

4. A vehicle air skirt apparatus comprising:

a skirt which blocks inflow of a headwind; and a winding unit which winds the skirt, the winding unit including an actuator which generates power, a roller which is coupled to the skirt and winds the skirt, a holder coupled to an end portion of the skirt, and a driving link which connects the holder and the actuator and moves the holder using the power generated by the actuator.

5. The vehicle air skirt apparatus of claim 4, wherein the skirt is deployed or retracted in conjunction with movement of the holder in a direction intersecting a direction in which the roller is disposed.

6. The vehicle air skirt apparatus of claim 4, wherein the skirt includes a material having waterproofness and flexibility.

7. The vehicle air skirt apparatus of claim 4, wherein the driving link includes:

a first link coupled to the actuator;

a second link which connects the first link and the holder and moves in conjunction with movement of the first link; and a pin which rotatably couples the second link to the holder and transfers a force generated by movement of the second link to the holder.

8. The vehicle air skirt apparatus of claim 7, comprising a housing which rotatably supports the roller and the first link.

9. The vehicle air skirt apparatus of claim 8, comprising an anti-slip link which connects the housing and the holder and prevents the skirt and the holder from being pushed back.

* * * * *